(12) United States Patent
Helbing

(10) Patent No.: US 6,690,854 B2
(45) Date of Patent: Feb. 10, 2004

(54) OPTICAL WAVELENGTH DIVISION MULTIPLEXER

(75) Inventor: Rene Helbing, Palo Alto, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 56 days.

(21) Appl. No.: 10/098,244

(22) Filed: Mar. 15, 2002

(65) Prior Publication Data

US 2003/0174936 A1 Sep. 18, 2003

(51) Int. Cl.[7] .............................................. G02B 6/28
(52) U.S. Cl. ..................... 385/24; 385/11; 385/16; 385/14; 398/9; 359/483; 372/6
(58) Field of Search ........................... 385/24, 37, 11, 385/16, 30, 14, 15, 1, 40; 398/9, 1, 55, 90; 359/341.1, 497, 484, 485, 483; 372/6, 22, 23, 50

(56) References Cited

U.S. PATENT DOCUMENTS 6,026,202 A * 2/2000 Chang ........................ 385/11
6,088,491 A * 7/2000 Sorin et al. ................. 385/11

* cited by examiner

Primary Examiner—Phan T. H. Palmer

(57) ABSTRACT

An optical wavelength division multiplexing (WDM) device comprising optical components that are integrated together to provide an optical WDM that does not require circulators, that has simplified alignment and that is relatively low in cost. The WDM device comprises an integrated port separator, a dispersive element and a reflector. The integrated port separator comprises various optical components, that spatially separate the polarization components of a light beam input through an input port of the integrated port separator. The spatially separated polarization components are output from the integrated port separator and impinge on the dispersive element, which spatially separates the wavelengths associated with the polarization components impinging thereon. The spatially separated wavelengths then impinge on the reflective element and are reflected with angles of polarization that depend on the state of the reflective element. The reflected polarization components maintain their respective wavelengths when they are reflected. However, when they are reflected, they are directed along a path through the integrated port separator that depends on the angles of polarization of the reflected polarization components, which depends on the state of the reflective element.

16 Claims, 4 Drawing Sheets

Directional stage   Polarization stage top view side view 3D view

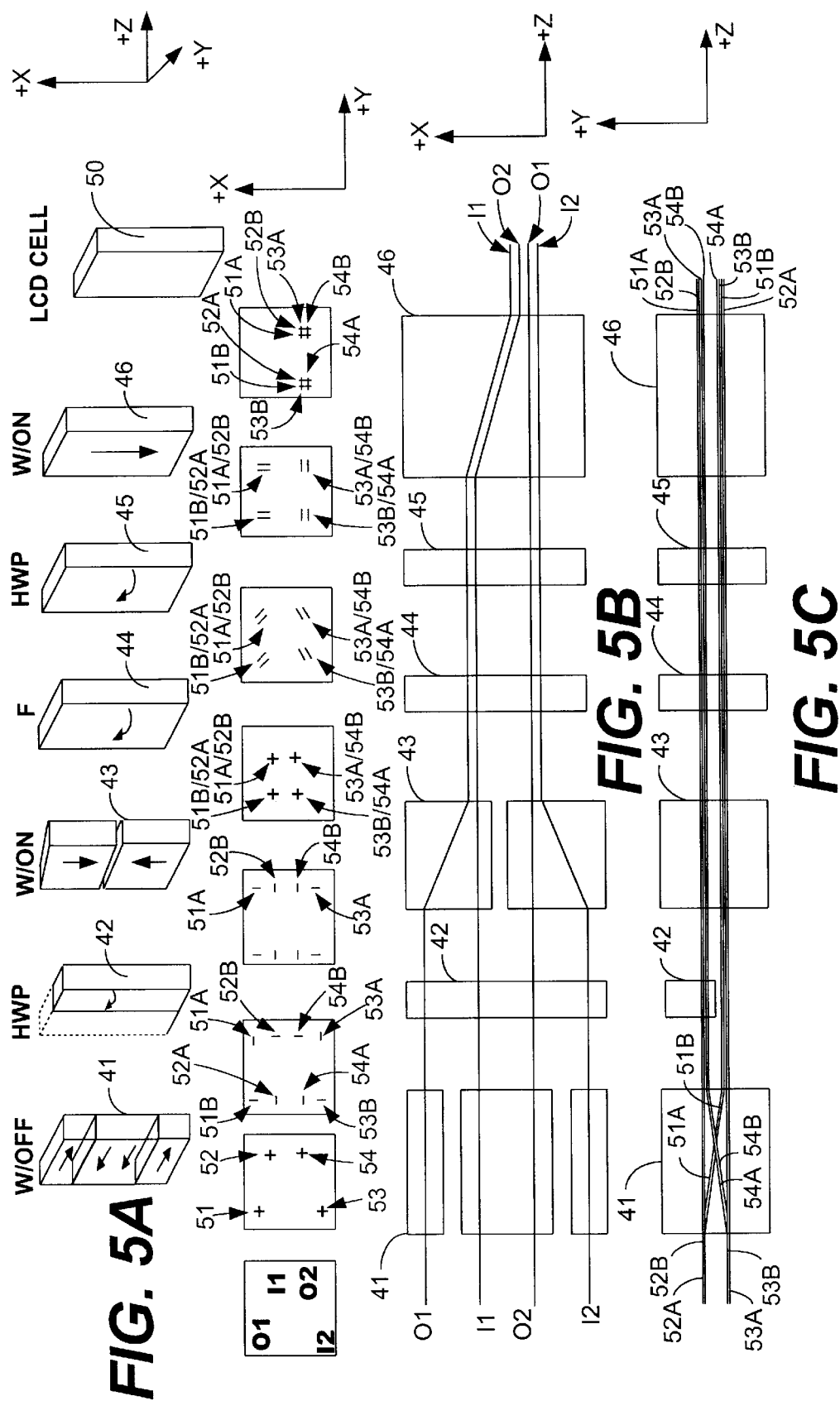

OPTICAL WAVELENGTH DIVISION MULTIPLEXER

BACKGROUND OF THE INVENTION

The present invention relates to a wavelength division multiplexer (WDM) and, more particularly, to an optical WDM that is a reflective system and is integrated.

Optical WDMs enable light of multiple wavelengths to be spatially dispersed such that each wavelength of light is spatially separated from every other wavelength of light. WDM devices typically comprise two major functional portions. The first portion provides spatial demultiplexing (i.e., the dispersion) of the individual wavelengths through the use of a grating (e.g., an array waveguide grating, a filter array, etc.). The second portion then acts on one or more of the spatially dispersed wavelengths for purposes of, for example, attenuation, monitoring, compensation or switching.

In a reflective system, these wavelengths are then sent back through the same dispersion element, thereby multiplexing them (i.e., combining the wavelengths) again onto one optical fiber. In fiber optic networks, reflective WDM systems are increasingly being used because of their lower complexity, smaller size and lower part count compared to transmissive WDM systems. However, the use of a reflective system requires the use of circulators to separate the incoming and outgoing signals. Circulators are often expensive and difficult to integrate into a small optical system. In addition, systems using polarization sensitive elements are more complex and require another circulator-like separation stage to route a signal between the different ports. In addition to having a large part count, these types of systems typically require precision alignment of several optical components, which is time consuming and expensive.

Accordingly, a need exists for an optical WDM device that is a reflective system., but that is smaller in size than known reflective WDM systems, that has a smaller part count than known reflective WDM systems, that does not require a circulator, and that does not require alignment of optical components.

SUMMARY OF THE INVENTION

The present invention provides an integrated, reflective optical WDM device comprising optical components that are integrated together to provide a reflective WDM device that does not require any circulators, that has simplified alignment due to its integrated characteristics, and that is relatively low in cost. The WDM device comprises the integrated port separator, a dispersive element and a reflector.

The integrated port separator comprises various optical components that spatially separate the polarization components of a light beam input through an input port of the integrated port separator. The spatially separated polarization components are output from the integrated port separator and impinge on the dispersive element, which spatially separates the wavelengths associated with the polarization components impinging thereon. The spatially separated wavelengths then impinge on the reflective element and are reflected with angles of polarization that depend on the state of the reflective element. The reflected polarization components maintain their respective wavelengths when they are reflected. However, when they are reflected, they are directed along a path through the integrated port separator that depends on the angles of polarization of the reflected polarization components, which depends on the state of the reflective element.

Preferably, the reflective element comprises an array of liquid crystal display (LCD) pixels, each of which is individually controllable. Thus, the path of each polarization component through the integrated port separator depends on the state of the LCD pixel upon which the polarization component impinges, which depends on the wavelength associated with each polarization component and the manner in which the dispersive element spatially separates the wavelengths to cause the corresponding polarization component to impinge on the reflective element.

The optical device can be used for various purposes, such as, for example, for protection switching, in add/drop modules and in other applications where a polarization sensitive manipulation of wavelengths is needed or desired. These and other features and advantages of the present invention will become apparent from the following description, drawings and claims.

BRIEF DESCRIPTION OF THE DRAWINGS

FIG. 5A is a polarization diagram demonstrating another embodiment that utilizes a different configuration of components and the manner in which the components perform particular polarization functions to enable wavelength division multiplexing to be performed.

FIG. 5B is a top view of the WDM device of the present invention represented by FIG. 5A.

FIG. 5C is a side view of the WDM device of the present invention represented by FIG. 5A.

DETAILED DESCRIPTION OF THE PREFERRED EMBODIMENTS

Figure 1:
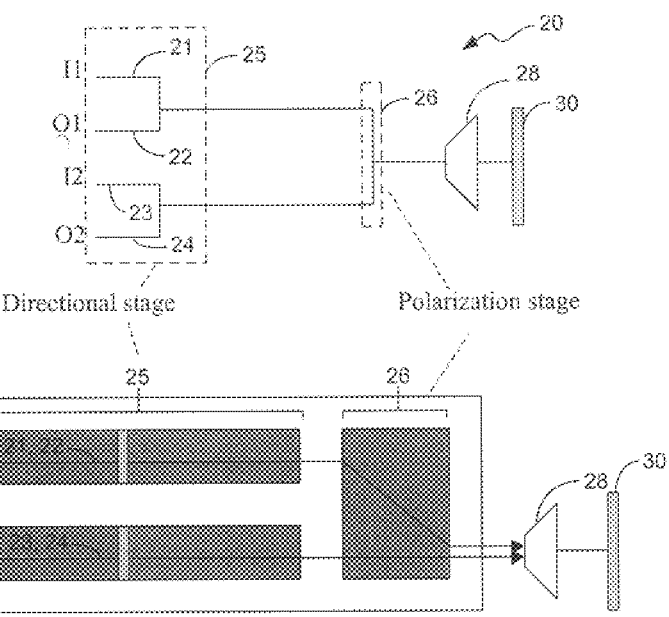
FIG. 1 is a schematic diagram of the optical device of the present invention in accordance with one embodiment.

An example design of the integrated optical WDM of the present invention in accordance with one embodiment is shown in FIGS. 1–4. FIG. 1 is a schematic diagram of the optical WDM 20 of the present invention. The WDM 20 preferably comprises four pigtailed ports, I1, O1, I2 and O2, which are represented by numerals 21, 22, 23 and 24, respectively, a directional stage 25, a polarization stage 26, a dispersion element 28 and a reflective element 30 having a plurality of states. The reflective element 30 preferably is an array of liquid crystal cells, or pixels, each having a plurality of states that can be controllably selected.

Each of the input ports 21 and 23 is configured to receive light from an end of an optical fiber (not shown). Each of the output ports 22 and 24 is configured to output light into an end of an optical fiber. Optics for relaying the light output between the fibers and the integrated WDM optics, may include, for example, gradient-index (GRIN) lenses, microlenses or thermally expanded core (TEC) fibers.

The WDM device 20 can be viewed as having a 2-stage separation in a tree-like structure. In the stage represented by the dashed box 25, the light entering input ports I1 and I2 is split into separate polarization beams that are then operated on by various optical components to provide them with a particular polarization. Each polarized beam may comprise a plurality of wavelengths of light. Since the direction of the light is used to define the positions of the light paths I1 and O1 and I2 and O2, respectively, the stage 25 will be referred to herein as the directional stage. In the stage represented by dashed box 26, the path of the light depends on the polarization of the light on the incoming light paths I1 and I2 and on the outgoing light paths O1 and O2. Therefore, stage 26 will be referred to herein as the polarization stage because it directs the light based on its polarization.

For the input beams I1 and I2 propagating through the stage 26, the stage 26 provides the polarization components associated with each input beam with a particular polarization that causes light from I1 and I2 to be reflected along output paths O1 and O2, respectively, when the reflective element 30 is not rotated, and that causes light from I1 and I2 to be reflected along output paths O2 and O1, respectively, when the reflective element 30 is rotated. For the output beams O1 and O2, the polarization of the light depends on the state of the reflective element 30, which determines how the light will be operated on by the polarization stage 26 when it is reflected by the reflective element 30.

It should be noted that the dispersion element 28 receives the polarization components from the polarization stage 26 as they propagate towards the reflective element 30 and disperses (i.e., spatially separates) the wavelengths and their respective polarization components, thereby causing the polarization components to impinge on different pixels of the LC pixel array of the reflective element 30. As stated above, each pixel has a plurality of states that can be selectively controlled.

In the preferred embodiment, if the LC pixel upon which polarization components from the I1 path impinge is not rotated, the polarization components will be output via the O1 path. Conversely, if the LC pixel upon which polarization components from the I1 path impinge is rotated by 90°, the polarization component will be output via the O2 path. Likewise, if the LC pixel upon which polarization components from the I2 path impinge is not rotated, the polarization components will be output via the O2 path. Conversely, if the pixel upon which a polarization components from the I2 path impinge is rotated by 90°, the polarization components will be output via the O1 path.

Because the reflected polarization components have signatures of the wavelengths associated with them, outputting the reflected polarization components along a particular path is the equivalent of outputting the wavelengths associated with the reflected polarization components along the particular path. For example, if light input at I1 comprises certain wavelengths that need to be output via output path O2 (i.e., dropped, or tapped off, at a certain location in a network) and other wavelengths need to continue in the forward direction (i.e., through output path O2), then certain pixels of the reflective element 30 would be rotated by 90° and other pixels would not be rotated. For the pixels that are rotated, the wavelengths of light associated with the reflected polarization components would be combined by the dispersion element 28 and output via path O2. For the non-rotated pixels, the wavelengths of light associated with the polarization components reflected by those pixels would be combined by the dispersion element 28 and output via path O1. Thus, it can be seen how light of different wavelengths can switched so that it is output through the O1 port or the O2 port, regardless of whether the light is input through input port I1 or input port I2.

In order to implement the directional stage 25, preferably walk-off crystals, faraday rotators and half waveplates are utilized to accomplish light path separation. These components are selected and combined in such a way that the light from either of the input ports I1 21 and I2 23 that is reflected by the reflective element 30 can only enter the output ports O1 22 and/or O2 24. In other words, reflection of the light back to an input port ca be avoided. In order to implement the polarization stage 26, a polarization beamsplitter, a wollaston prism, or a walk-off crystal, for example, is used to provide the polarization components with one or more particular angles of polarization. The dispersive element 28 preferably is a grating, such as an arrayed waveguide grating (AWG). The manner in which these components are implemented to accomplish these tasks will be described below in detail with reference to FIG. 4.

Figure 2A:
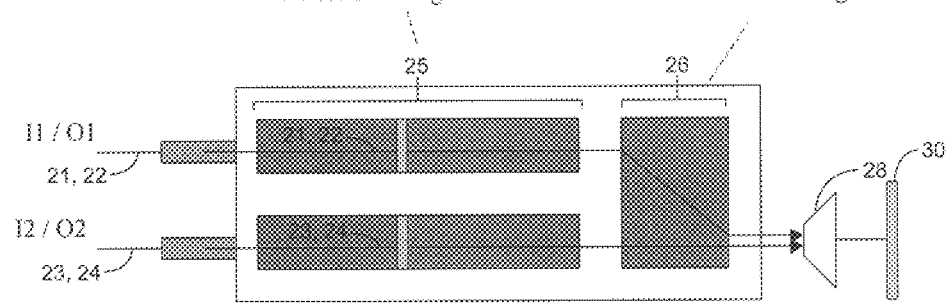
FIG. 2A is a top view of the optical device of the present invention shown in FIG. 1.
Figure 2B:
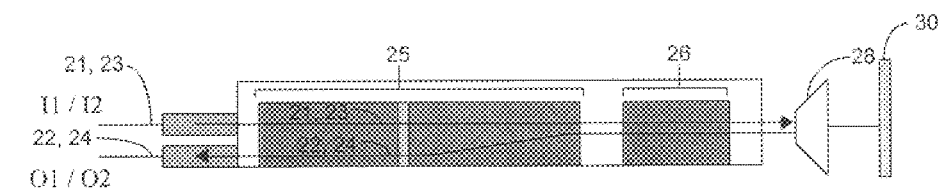
FIG. 2B is a side view of the optical device of the present invention shown in FIG. 1.

A top view and a side view of the integrated optical WDM 20 are shown in FIG. 2A and FIG. 2B, respectively. With reference to the top view of FIG. 2A, the I1 21 and O1 22 light paths remain in the same vertical planes over the course of those light paths through the WDM device 20. Therefore, both light paths, although spatially separated, are represented by the single line labeled 21, 22. Similarly, the I2 23 and O2 24 light paths are in the same vertical planes with respect to the top view of FIG. 2A over the course of those light paths through the device 20. Therefore, both of those light paths, although spatially separated, are also represented by the single line labeled 23, 24.

In FIG. 2B, the light paths I1 21 and I2 23 are in the same transverse planes over the course of those light paths through the device 20 with respect to the side view. Therefore, both light paths, although spatially separated, are represented by the single line labeled 21, 23. Similarly, the O1 22 and O2 24 light paths are in the same transverse planes with respect to the side view of FIG. 3B over the course of those light paths through the device 20. Therefore, both of those light paths, although spatially separated, are represented by the single line labeled 22, 24.

Figure 3:
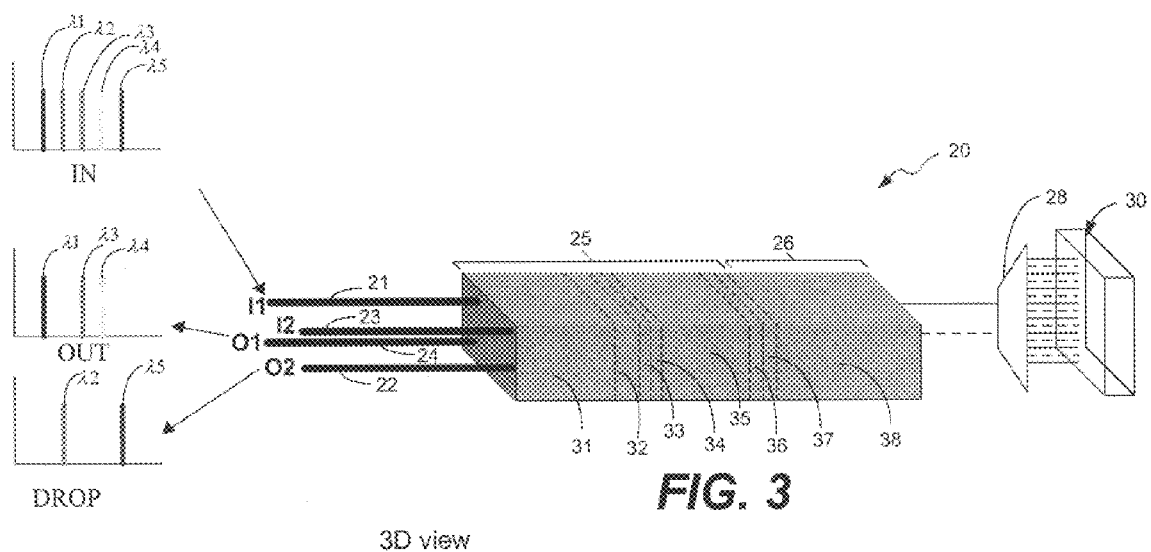
FIG. 3 is a perspective view of the optical device of the present invention configured in a particular manner using particular components and materials.

FIG. 3 illustrates a perspective view of the WDM 20 of the present invention in accordance with one embodiment, which includes a view of the complete, fully-integrated package, including the four pigtailed ports I1 21, I2 23, O1 22 and O2 24. The directional stage 25 is comprised of a first walk-off element (WO1) 31, a compensation element (Comp) 32, a first Faraday rotator (F1) 33, a first half-waveplate (HWP1) 34, a second walk-off element (WO2) 35, a second Faraday rotator (F2) 36 and a second half-waveplate (HWP2) 37. The polarization stage 26 comprises a polarization combining and separating stage, which may be, for example, a third walk-off element (WO3) 38.

FIG. 3 also illustrates an example of the manner in which a group of wavelengths, $\lambda 1$, $\lambda 2$, $\lambda 3$, $\lambda 4$ and $\lambda 5$ can be input from one input port, which is I1 in this example, separated by the dispersion element 28, and reflected by the reflective element 30 such that some ($\lambda 1$, $\lambda 3$, $\lambda 4$) of the wavelengths are combined by the dispersion element 28 onto the O1 path and output through output port O1 and some ($\lambda 2$ and $\lambda 5$) of the wavelengths are combined by the dispersion element 28 onto the O2 path and output through output port O2.

Figure 4:
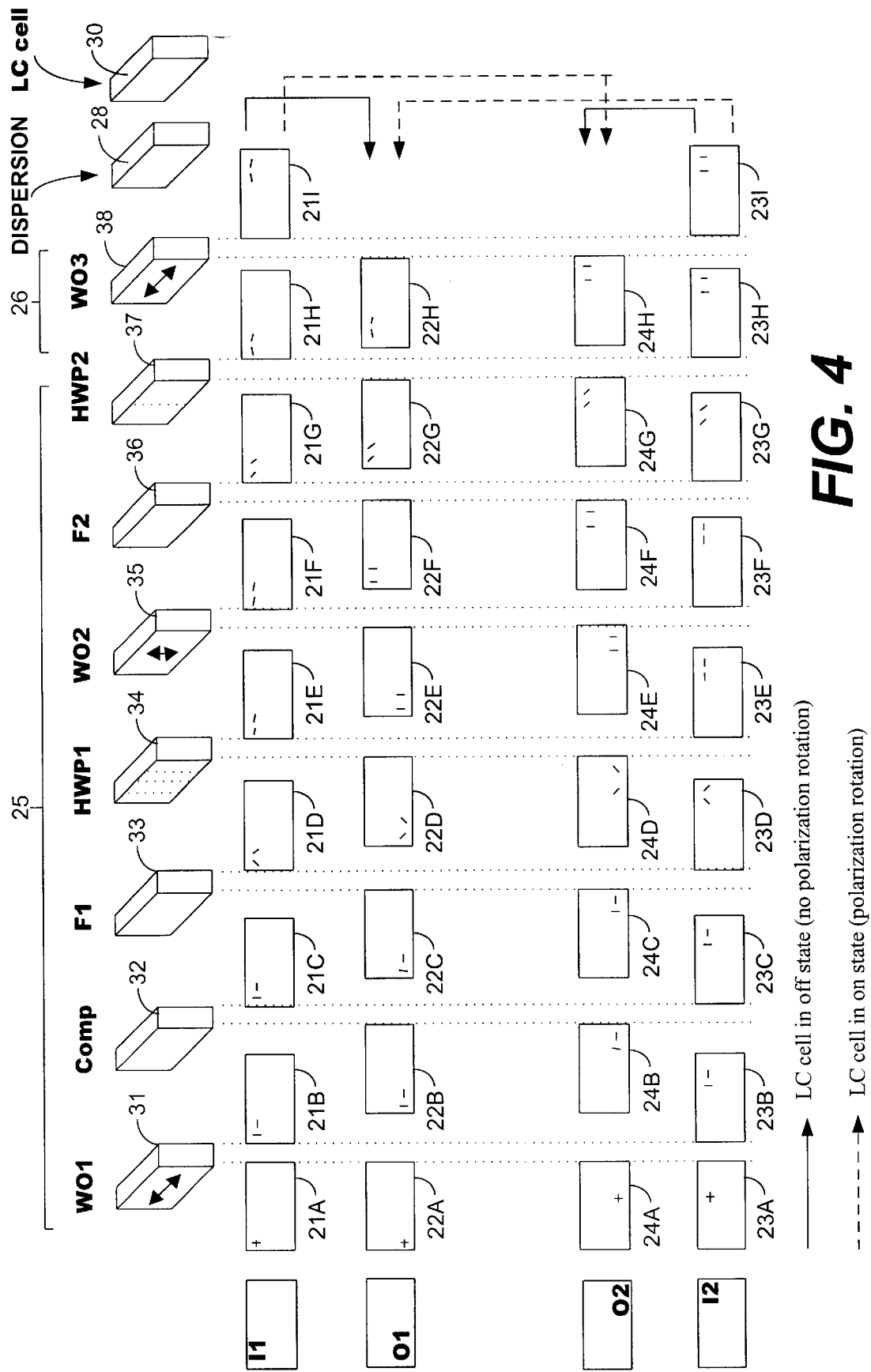
FIG. 4 is a polarization diagram demonstrating the manner in which the components shown in FIG. 3 perform particular polarization functions for wavelength division multiplexing.

The manner in which these components operate in conjunction with one another to accomplish the switching action of the WDM 20 can be seen in FIG. 4. FIG. 4 shows the polarization of each of the components 31–38 for each of the light paths 21–24. The blocks 21A–21I show the polarization of each of the components 31–38 and LC cell 30, respectively, along light path I1 21. The blocks 22A–22H show the polarization of each of the components 31–38, respectively, along light path O1 22. The blocks 24A–24H show the polarization of each of the components 31–38, respectively, along light path O2 24. The blocks 23A–23I show the polarization of each of the components 31–38 and LC cell 30, respectively, along light path I2 23.

Light that enters the input ports I1 21 and I2 23 will have a polarization vector that can be resolved into two orthogonal polarization components. Likewise, light exiting output ports O1 22 and O2 24 will have a polarization vector that corresponds to the combination of the two orthogonal polarization components. Essentially, the polarization vector of the respective light signals entering a respective input port is initially resolved into two separate orthogonal polarization components, walked-off in particular directions, and rotated in particular manners so that the light signals from these ports of various wavelengths that pass through the dispersion element 28 and impinge on the reflective element 30 will be reflected, combined and output through either output port O1 22, output port O2 24, or partially through each of the output ports O1 22 and O2 24. However, the arrangement is such that none, or substantially none, of the light from one of the input ports I1 or I2 is reflected back into one of the input ports.

Also, the polarization components of each of the respective polarization vectors of each of the respective signals will be combined before exiting the output ports O1 and/or O2, as indicated by the plus signs in blocks 22A and 24A. Therefore, whereas respective input paths of the directional stage 25 separate the respective polarization vectors into separate polarization components and operate on them in a particular manner, the output paths of the directional stage 25 operate on the respective reflected, separated polarization components in a particular manner and combine the respective polarization components into respective polarization vectors.

The waveplates 31, 34 and 37 may be made of quartz, which is a material typically used to produce waveplates. The walk-off elements 31, 35 and 38 may be made of yttrium vanadate or of a rutile material, for example. A walk-off crystal has a polarization direction defined by its crystal structure. The Faraday rotators 33 and 36 may be made of garnet, for example. Faraday rotators rotate light polarization through the application of a magnetic field. The Faraday rotators can be "latched" Faraday rotators. Latched Faraday rotators will continue to rotate light through magnetization even after the magnetic field is no longer being applied to the latched Faraday rotator. Alternatively, a magnet may be embedded in the integrated WDM device 20 adjacent to or in close proximity to the Faraday rotator to enable the necessary magnetic field to be generated.

These components are known in the art and the manner in which they operate on light signals to separate the polarization vector of a light signal into polarization components and to operate on the polarization components in a particular manner is discussed in detail in U.S. Pat. Nos. 6,088,491 and 6,026,202, which are incorporated by reference herein in their entireties. Therefore, a detailed discussion of the manner in which these components can be implemented to perform the necessary operations will not be provided herein.

The polarization vector of the light signal entering port I1 from an optical fiber initially is not separated into separate orthogonal components, as indicated by the small cross in the block 21A. However, after the incoming light signal passes through WO1 31, the horizontal polarization component of the light signal is separated and displaced from the vertical polarization component in the walk-off direction, as indicated by block 21B. WO1 31 operates only on the polarization component of the light that is parallel to the walk-off direction of the WO1 31 (i.e., only on the horizontal polarization component, which is parallel to the walk-off direction indicated by the horizontal arrow in block 31). This separates and displaces the horizontally polarized component from the vertically polarized component. Thus, light having a polarization that is parallel to the walk-off direction of WO1 31 is separated into a beam by WO1 31 that has the same orientation as WO1 31. Light having a polarization that is not parallel to the walk-off direction of WO1 31 is not displaced, but forms a beam that is coincident with the original light beam and that has a polarization that is orthogonal to the polarization of the displaced beam.

These beams then pass through the compensation element 32, which does not change the polarization of the beams, but simply compensates for any light path length differences caused by the walk-off displacement. The light then passes through a first Faraday rotator F1 33, which changes the direction of polarization of each of the beams by 45°, as indicated by the lines in block 21D. The light then passes through a first half waveplate HWP1 34, which separately rotates the polarizations of each of the beams such that they both have a horizontal polarization, as indicated by block 21E. The dashed lines in the HWP1 component 34 indicate that each portion of the component operates on the polarized beams differently, which is also apparent from the notation in blocks 21E, 22D, 23E and 24D. Along input path I1 21, because the polarization components are horizontal, they will not be affected as they pass through the second walk-off element WO2 35, which has a vertical walk-off direction, as indicated by the vertical double-ended arrow in block 35.

It should be noted that light propagating along the O1 22 and O2 24 light paths in the reverse direction will be spatially displaced by WO2 35 because, as shown in blocks 22F, 22E, 24F and 24E, the light beams along these paths are vertically polarized at this point, as indicated by the vertical parallel lines in these blocks and the vertical displacement of those lines between blocks 22F and 22E and between blocks 24F and 24E. The shift in direction of the O1/O2 light paths with respect to the I1/I2 light paths can be seen in the directional stage 25 from the side view of the device 20 shown in FIG. 2B.

The light beams traveling along the I1 light path 21 then pass through the second Faraday rotator F2 36, which rotates the polarizations of the beams by 45°, as shown in block 21G. F2 36 operates on light traveling along light paths O1 and O2 to rotate the polarizations such that they are vertical, as indicated by the lines in blocks 22G, 22F, 24G and 24F, which enables the O1 and O2 light path polarizations to be operated on by WO2 35 in order to direct those light paths in the direction indicated in the directional stage 25 shown in the side view of FIG. 3B.

The light beams traveling along I1 then pass through HWP2 37, which rotates the polarizations of both beams into horizontal polarizations, as indicated by the lines in 21H. The light beams traveling along I1 then passes through the polarization stage 26, which corresponds, in this example, to the WO3 block 38. The WO3 38 changes the direction of the light beams such that the beams corresponding to light path I1 are displaced horizontally in the manner indicated in the polarization stage 26 shown in the top view of FIG. 2A. The horizontal displacement is indicated by the horizontal lines in block 21H and their movement from the left, upper corner of that block to the right, upper corner of block 21I.

The light beams corresponding to light path I1 having the polarization shown in block 21I then pass through the dispersion element 28, which spatially separates all of the wavelengths in the light beams. When the wavelengths of the light beams are spatially dispersed, the polarization components of the light beams impinge on various pixels of the reflective element 30, depending on the wavelength associated with the polarization components. When the pixel that the polarization components impinge on is not rotated, the light beams corresponding to light path I1 are reflected by that pixel and combined by the dispersion element such that they pass through WO3 38, which displaces the beams horizontally. This horizontal shift in polarization is indicated by the horizontal shift in the position of the lines in block 21I to the positions shown in block 22H. Therefore, in this case, the reflected light enters the O1 light path and is operated on by the elements of the directional stage 25 in the manner indicated by the lines in blocks 22H–22A.

It should be noted that, in the vertical planes, the O1 light path tracks the I1 light path, but is below it in the transverse planes due to WO2, as shown in the top view of FIG. 2A and as indicated by the shift of the polarization components in the vertical direction in correspondence with the lines in blocks 22F and 22E. It should also be noted that the WO1 31 combines the polarization components of the light traveling on light paths O1 and O2, respectively, just before they are output through output ports O1 and O2, respectively. This is indicated by the lines in blocks 22B and 22A and 24B and 24A.

The different location of the cross in block 23A compared to the location of the cross in block 21A indicates the horizontal separation of the beams on input light paths I1 and I2, which is evident from the top view of FIG. 2A. With respect to the I2 light path, the horizontal polarization component is separated from the vertical polarization component when the light passes through WO1 31, as indicated by the polarization notation lines in block 23B. The polarization changes indicated by the polarization notation in blocks 23B–23G for the I2 light path are essentially the same as those indicated by blocks 21B–21G, respectively, for the I1 path. Likewise, the polarization changes indicated by blocks 22G–22A for the O1 light path are essentially the same as those indicated by blocks 24G–24A for the O2 light path. However, HWP2 37 operates on the polarization components of light on light paths I2 and O2 in a manner different from the manner in which it operates on the polarization components of light on light paths I1 and O1. HWP2 37 rotates the polarization components of light on light path I1 so that they are horizontal, whereas it rotates the polarization components of light on light path I2 so that they are vertical, as indicated by blocks 21H and 23H, respectively.

Because of this difference, when the polarization of the corresponding LC pixel of the reflective element 30 is not rotated, reflected light on the I1 light path is combined by the dispersion element 28 according to wavelength onto light path O1 and is shifted horizontally while maintaining the same polarization, as indicated by blocks 21I and 22H. The horizontal shifting of the polarization components is due to the fact that WO3 38 is a horizontal walk-off crystal. With respect to light traveling along light path I2, when the polarization of the corresponding LC pixel of the reflective element 30 is not rotated, the reflected light is combined by the dispersion element 28 according to wavelength onto light path O2 and passes through WO3 38 without being shifted and while maintaining its vertical polarization, as indicated by blocks 23I and 24H. The vertical polarization components are not even shifted due to the fact that WO3 38 is a horizontal walk-off crystal. With these polarizations, the reflected I1 light can only enter light path O1 and the reflected I2 light can only enter light path O2. The reflected light then passes through the directional stage 25 along the respective output light paths and exits the integrated optical WDM 20 through the respective output ports.

When the corresponding LC pixel of the reflective element 30 is fully rotated (i.e., rotated by 90°), the light on light path I1 having the polarization indicated by block 21I is dispersed by the dispersion element 28 and reflected by the rotated pixel with a vertical polarization such as that shown in block 24H. This light then passes through WO3 38 unaffected and thus is conditioned only to propagate along the O2 light path. As stated above, the polarization components have wavelengths associated with them. Therefore, directing polarization components from light path I1 onto light path O2 is the equivalent of directing the wavelengths associated with those polarization components from light path I1 onto light path O2.

With respect to light path I2, when the corresponding LC pixel of the reflective element 30 is fully rotated (i.e., rotated by 90°), the light on light path I2 having the polarization indicated by block 23I is dispersed by the dispersion element 28 and reflected by the rotated pixel with a horizontal polarization such as that shown in block 22H. This light is conditioned only to propagate along the O1 light path. Therefore, when the polarization components are combined by the dispersion element 28 according to the wavelengths associated with them, the light naturally will propagate only along light path O1 to the O1 output port. As stated above, directing polarization components from light path I1 onto light path O2 and from light path I2 onto light path O1 is the equivalent of directing the wavelengths associated with those polarization components along those paths. Hence, by controlling the states of the pixels of the reflective element, wavelengths can be selectively separated out by the WDM of the present invention. This allows wavelengths to be selectively separated out and dropped (e.g., switched from I1 to O2) or added (e.g., all wavelengths of light from I1 go to O1 and at least some wavelengths of light from I2 go to O1). Of course the WDM of the present invention can serve many other purposes. For example, it can be used simply to attenuate light of certain wavelengths by separating out the wavelengths and then discarding them through an output port. Those skilled in the art will understand, in view of the discussion provided herein, the many purposes for which the WDM of the present invention is suited.

Another example embodiment of the optical WDM device of the present invention will now be described with reference to FIGS. 5A–5C. FIG. 5A illustrates a configuration of various optical components and the manner in which they operate on the polarization components of light to perform the WDM functions. The concepts are generally the same as those described above with reference to FIG. 4, but the configuration of the WDM is different from the configuration of FIG. 4. FIG. 5B illustrates a top view of the components shown in FIG. 5A and the manner in which the polarization components of input light and reflected light propagate through the optical WDM device. FIG. 5C illustrates a side view of the components shown in FIG. 5A and the manner in which the polarization components of input light and reflected light propagate through the optical WDM device.

With reference to FIG. 5A, the optical WDM device is comprised of a walk-off (W/OFF) element 41, a half waveplate (HWP) element 42, a walk-on (W/ON) element 43, a Faraday rotator 44, another HWP element 45, a walk-on (W/ON) element 46, a dispersion element 47 and a reflective element 50, which preferably is an array of selectively controllable LC pixels, as in the embodiment of FIG. 4. The block 51 illustrates four light beams, each of which has two polarization components that are orthogonally combined. Light beams 51 and 52 correspond to the O1 and I1 light paths, respectively, and light beams 53 and 54 correspond to the I2 and O2 light paths, respectively. For incoming light, the W/OFF element 41 displaces the horizontal polarization component 52A of beam 52, which corresponds to the I1 input light, from its vertical component 52B. Likewise, the W/OFF element 41 displaces the horizontal polarization component 53A of beam 53, which corresponds to the I2 input light, from its vertical component 53B. For outgoing light to be output from the optical device, the W/OFF element 41 combines the horizontal component 54A of beam 54, which corresponds to the output light path O2, with its vertical component 54B. Likewise, the W/OFF element 41 combines the horizontal component 51A of beam 51, which corresponds to the output light path O1, with its vertical component 51B. This separating and combining of the polarization components can be seen in block 41 of FIG. 5C.

The HWP 42 only operates on the separated polarization components in the right side of the box, namely, polarization components 51A, 52B, 53A and 54B. This can also be seen from block 42 in FIG. 5C in that only half of the polarization components propagate through the HWP 42. For the separated polarization components 52B and 53A of the incoming light, HWP 42 applies a clockwise 90° rotation, as indicated by the horizontal orientations of the dashes in the following box. With respect to the outgoing light, the polarization components 51A and 53A are also rotated clockwise by 90° as they pass through the HWP 42 propagating in the direction of the W/OFF element 41, as shown in the box proceeding the HWP 42. The W/OFF element 41 then orthogonally combines polarization components 51A and B and 54A and B to form two beams, each having two polarization components that are orthogonal to each other.

With respect to the input light, after the polarization components have been rotated by 90° in the clockwise direction, the input light passes through W/ON element 43. The input light polarization components 53A and B, which are now vertically polarized, are shifted upwards. This can be seen from the vertical incline of the I2 input shown in block 43 FIG. 5B. The input light polarization components 52A and B of the I1 input remain horizontally polarized and are not affected as they propagate through the W/ON element 43, as indicated by the straight I1 line passing through block 43 in FIG. 6B. With respect to the output light, the W/ON element 43 shifts the polarization components 51A and B of the output light O1 down, but leaves them vertically polarized. This shift can be seen by the upward incline in block 43 of FIG. 5B with respect to the direction of the output light. The polarization components 54A and B of the output light O2 remain horizontally polarized and are not operated on by the W/ON element 43, as indicated by the O2 line passing straight through block 43 in FIG. 5B.

The Faraday rotator 44 rotates the horizontally and vertically polarized input light polarization components 52A and B and 53A and B, respectively, by 45°. The HWP 45 then rotates the input light polarization components 53A and B and 52A and B clockwise by 45° such that the input light polarization components 52A and B are vertically polarized and the input light polarization components 53A and B are horizontally polarized. The W/ON element 46 then shifts the vertically polarized input light polarization components 52A and 52B down such that they are spatially coincident with and orthogonal to the horizontally polarized input light polarization components 53A and B, respectively. The downward shift of the vertically polarized input light polarization components 52A and 52B is indicated by the downward incline in block 46 of FIG. 5B with respect to the direction of propagation of the input light.

In the opposite direction, the vertically-polarized reflected light polarization components 51 A and B are shifted down to separate them from the horizontally-polarized output light polarization components 54A and B. When the an LC pixel of the reflective element 50 is in a state in which polarization is not rotated, the spatially-separated vertically polarized input light polarization components 52A and B of input light I1 will be reflected by the pixel with the same polarization, which is orthogonal to the polarizations of the input light polarization components 53A and B of the input light I2, and to output light polarization components 54A and B of the output light O2. Therefore, the reflected light from port I1 will only propagate out of the optical device via the O1 light path because that is the only light path that is capable of properly re-separating and re-combining the output light polarization components. The dispersion element 47 separates the incoming light and combines the reflected light according to wavelength in the manner is discussed above with reference to FIG. 4.

The reflected I2 light, which is horizontally polarized, will only propagate out of the optical device via the O2 light path because that is the only light path that is capable of properly re-separating and re-combining the output light polarization components. On the other hand, if the corresponding pixels of the reflective element 50 is in a state in which the polarization is rotated by 90°, the polarizations of all of the light components reflected by the rotated pixels will be rotated by 90°. Therefore, the vertically-polarized input light polarization components 52A and B of input light I1 will be rotated by 90° such that these reflected light components will have a horizontal polarization. With this polarization, the polarization components will be properly re-separated and recombined as they propagate through and out of the optical device via optical path O2. Likewise, the polarization of the horizontally-polarized input light polarization components 53A and B will rotated by 90° such that they will be vertically polarized. With this polarization, the polarization components will be properly re-separated and recombined as they propagate through and out of the optical device via optical path O1. Therefore, rotating the angle of polarization of the corresponding pixels of the reflective element 50 by 90° will enable the optical device to function as a WDM because it is capable of separating the light according to wavelength, with each polarization component having a an associated wavelength, and channel the polarization components corresponding to any selected wavelengths from any input port to any output port.

It should be noted that although the example embodiments shown in FIGS. 4 and 5A each show two inputs and two outputs, the optical WDM device of the present invention may have only one input and two output. Preferably, the WDM device has two inputs and two outputs so that it is bi-directional and is capable of functioning with versatility. Spatial separation of the input light polarization components could occur before the input light is input to the optical device.

Those skilled in the art will understand the many possible applications of the present invention in view of the discussion provided herein. Of course, orientations of waveplates and crystals other than those shown in FIGS. 4 and 5A can be used to accomplish the goals of the present invention in an integrated form, as will be understood by those skilled in the art in view of the discussion being provided herein. Also, the present invention is not limited to the materials discussed herein for creating the components of the integrated optical WDM of the present invention. For example, as stated above, the reflective element of the present invention can be something other than a liquid crystal cell, and it can be something known now or discovered or developed in the future.

It should be noted that the above-described embodiments of the present invention are examples of implementations. Those skilled in the art will understand from the disclosure provided herein that many variations and modifications may be made to the embodiments described without departing from the scope of the present invention. All such modifications and variations are within the scope of the present invention.

What is claimed is:

1. An integrated optical wavelength division multiplexing (WDM) device having at least a first input port, I1, a first output port, O1, and a second output port, O2, the WDM device comprising:

a dispersion element, said dispersion element receiving light of a plurality of wavelengths, the light being comprised of polarization components, the dispersion element spatially separating the polarization components based on said wavelengths, each polarization component having a wavelength associated therewith;

a polarization-controlling reflector, said reflector having a plurality of spatially separated polarization controlling elements for receiving polarization components that have been spatially-separated by said dispersion element, the reflector reflecting the spatially-separated polarization components at reflected angles of polarization that depend on the states of the polarization controlling elements that reflect the spatially separated polarization components; and a polarization-dependent optical-path device that receives polarization components that have been coupled into the optical WDM device via the first input port I1 and manipulates the input polarization components to provide the input polarization components with particular angles of polarization, the input polarization components corresponding to the polarization components of the light received by the dispersion element, the impinging polarization components being reflected with angles of polarization that depend on the states of the polarization controlling elements, wherein when any one of the polarization controlling elements is in a first one of said plurality of states, any polarization component reflected as a result of impinging thereon is output via said first output port O1, and wherein when any one of the polarization controlling elements is in a second one of said plurality of states, at least a portion of the polarization components reflected as a result of impinging on one or more of said polarization controlling elements is output via said second output port O2.

2. The optical device of claim 1, wherein said polarization-dependent optical-path device includes an input polarization-dependent path splitting element, the input polarization-dependent path splitting element converting said input polarization components into spatially-separated input polarization components.

3. The optical WDM device of claim 2, wherein said polarization-dependent optical-path device includes an output polarization-dependent path splitting element, and wherein prior to any polarization components being output from said polarization-dependent optical-path device, the polarization-dependent optical-path device converts the reflected polarization components into output polarization components that are at least partially spatially-coincident.

4. The optical device of claim 3, wherein said optical WDM device further comprises a second input port, I2, and wherein the polarization-dependent optical-path device receives polarization components that have been coupled into the optical WDM device via the first input port I1 and via the second input port I2 and manipulates the input polarization components to provide the input polarization components with particular angles of polarization, the input polarization components corresponding to the polarization components of the light received by the dispersion element, and wherein when any one of the polarization controlling elements is in a first one of said plurality of states, any polarization component coupled into the WDM device via the first input port I1 that is reflected as a result of impinging on a polarization controlling element of the reflector is output via said first output port O1 and any polarization component coupled into the WDM device via the second input port I2 that is reflected as a result of impinging on a polarization controlling element of the reflector is output via said second output port O2, and wherein when any one of the polarization controlling elements is in a second one of said plurality of states, any polarization component coupled into the WDM device via the first input port I1 that is reflected as a result of impinging on a polarization controlling element of the reflector is output via said second output port O2 and any polarization component coupled into the WDM device via the second input port I2 that is reflected as a result of impinging on a polarization controlling element of the reflector is output via said second output port O1.

5. The optical device of claim 4, wherein said polarization-dependent optical-path device includes an input polarization-dependent path splitting element, the input polarization-dependent path splitting element converting said input polarization components into spatially-separated input-light polarization components.

6. The optical WDM device of claim 5, wherein said polarization-dependent optical-path device includes an output polarization-dependent path splitting element, and wherein prior to any polarization components being output from said polarization-dependent optical-path device, the polarization-dependent optical-path device converts the reflected polarization components into output polarization components that are at least partially spatially-coincident.

7. The optical WDM device of claim 6, wherein when any one of the polarization controlling elements of the reflector is in a third one of said plurality of states, at least a portion of the reflected polarization components is output via said first output port O1 and at least a portion of the reflected polarization components is output via said second output port O2.

8. The optical WDM device of claim 6, wherein said plurality of states constitutes a continuum of states such that said optical WDM device functions as an analog optical WDM device, and wherein the respective portions of polarization components that are output via said first output port O1 and the respective portions of polarization components that are output via said second output port O2 can be controllably varied by selecting the states of the polarization controlling elements of the reflector from said continuum of states.

9. The optical device of claim 6, wherein said polarization-dependent optical path device includes a polarization-dependent combiner element, the polarization-dependent combiner converting the reflected-light polarization components into output polarization components that are at least partially spatially-coincident before the polarization components are output from either of the output ports O1 or O2.

10. The optical WDM device of claim 3, wherein when any one of the polarization controlling elements of the reflector is in a third one of said plurality of states, at least a portion of the reflected polarization components is output via said first output port O1 and at least a portion of the reflected polarization components is output via said second output port O2.

11. The optical WDM device of claim 3, wherein said plurality of states constitutes a continuum of states such that said optical WDM device functions as an analog optical WDM device, and wherein the respective portions of polarization components that are output via said first output port O1 and the respective portions of polarization components that are output via said second output port O2 can be controllably varied by selecting the states of the polarization controlling elements of the reflector from said continuum of states.

12. The optical device of claim 3, wherein said polarization-dependent optical path device includes a polarization-dependent combiner element, the polarization-dependent combiner converting the reflected-light polarization components into output polarization components that are at least partially spatially-coincident before the polarization components are output from either of the output ports O1 or O2.

13. A method for performing optical wavelength division multiplexing with an optical wavelength division multiplexing (WDM) device, the method comprising the steps of:
providing an optical WDM device having a polarization-dependent optical path device, a dispersion element and an array controllable reflective elements, each having a plurality of states;
coupling input light into the optical WDM device;
using the polarization-dependent optical path device to separate the input light into input polarization components, each input polarization component having a wavelength associated therewith;
receiving the input polarization components at a dispersion element and using the dispersion element to spatially separate the input light components based on their associated wavelengths;
placing one or more of the controllable reflective elements of the array controllable reflective elements in one of said plurality of states, wherein the controllable reflective elements reflect the input polarization components that impinge thereon with reflected angles of polarization, the reflected angles of polarization depending on the states of the controllable reflective elements, wherein when any one of the polarization controlling elements is in a first one of said plurality of states, any polarization component reflected as a result of impinging thereon is output via said first output port O1, and wherein when any one of the polarization controlling elements is in a second one of said plurality of states, at least a portion of the polarization components reflected as a result of impinging on one or more of said polarization controlling elements is output via said second output port O2.

14. The method of claim 13, wherein said plurality of states constitutes a continuum of states such that said optical WDM device functions as an analog optical WDM device, and wherein the respective portions of polarization components that are output via said first output port O1 and the respective portions of polarization components that are output via said second output port O2 can be controllably varied by selecting the states of the polarization controlling elements of the reflector from said continuum of states.

15. The method of claim 13, wherein said polarization-dependent optical path device includes a polarization-dependent combiner element, the polarization-dependent combiner converting the reflected-light polarization components into output polarization components that are at least partially spatially-coincident before the polarization components are output from either of the output ports O1 or O2.

16. The method of claim 13, wherein said optical WDM device further comprises a second input port, I2, and wherein the polarization-dependent optical-path device receives polarization components that have been coupled into the optical WDM device via the first input port I1 and via the second input port I2 and manipulates the input polarization components to provide the input polarization components with particular angles of polarization, the input polarization components corresponding to the polarization components of the light received by the dispersion element, and wherein when any one of the polarization controlling elements is in a first one of said plurality of states, any polarization component coupled into the WDM device via the first input port I1 that is reflected as a result of impinging on a polarization controlling element of the reflector is output via said first output port O1 and any polarization component coupled into the WDM device via the second input port I2 that is reflected as a result of impinging on a polarization controlling element of the reflector is output via said second output port O2, and wherein when any one of the polarization controlling elements is in a second one of said plurality of states, any polarization component coupled into the WDM device via the first input port I1 that is reflected as a result of impinging on a polarization controlling element of the reflector is output via said second output port O2 and any polarization component coupled into the WDM device via the second input port I2 that is reflected as a result of impinging on a polarization controlling element of the reflector is output via said second output port O1.

* * * * *